Jan. 20, 1959     J. M. ALGINO ET AL     2,869,566
SAFETY SHUT-OFF GAS VALVE
Filed June 18, 1956     2 Sheets-Sheet 2
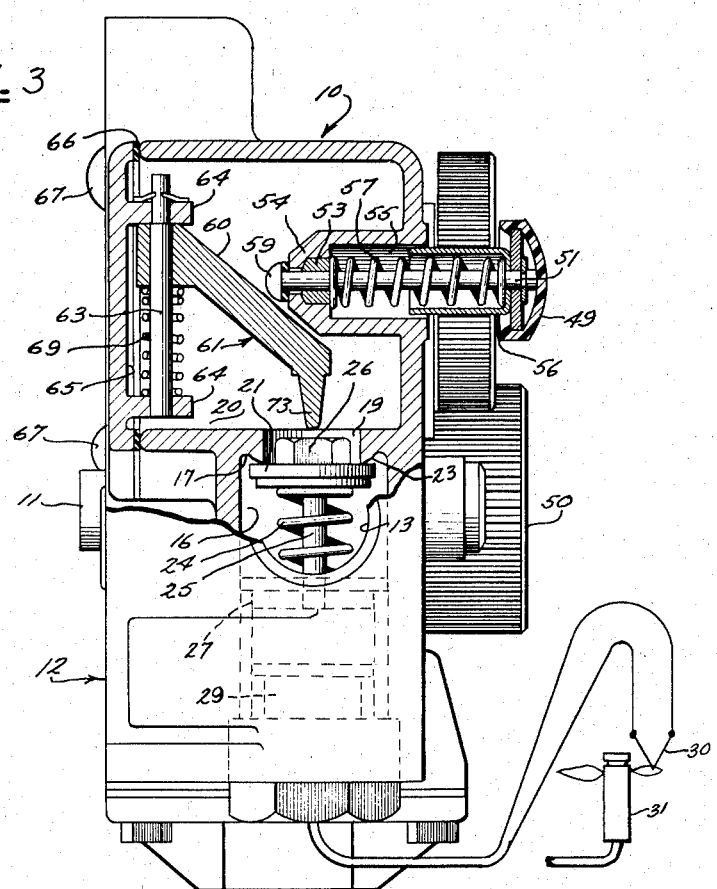
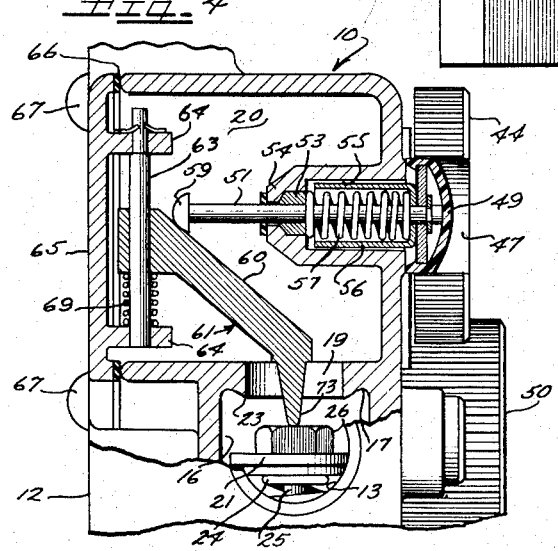
Inventors
JOSEPH M. ALGINO
JULIUS S. SLIMAK

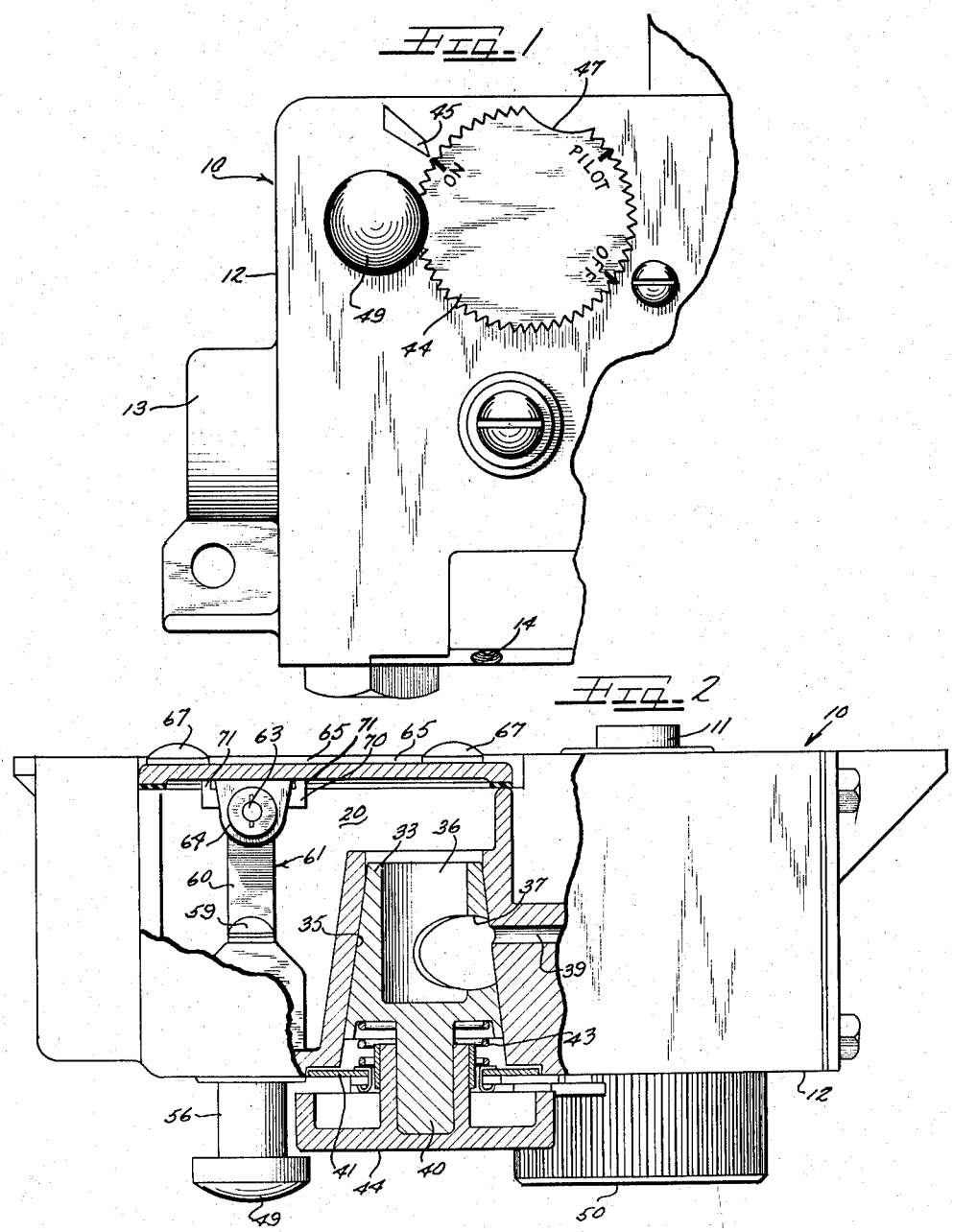

United States Patent Office 2,869,566
Patented Jan. 20, 1959

2,869,566

SAFETY SHUT-OFF GAS VALVE

Joseph M. Algino and Julius S. Slimak, Chicago, Ill., assignors to The Dole Valve Company, Chicago, Ill., a corporation of Illinois Application June 18, 1956, Serial No. 591,887

4 Claims. (Cl. 137—66)

This invention relates to improvements in control valves for gas burners and the like.

A principal object of the invention is to provide a simple and improved control valve for gas burners having a reset means for the valve arranged with the view toward utmost efficiency and simplicity in construction and operation.

Another object of the invention is to provide a resettable gas shut-off valve in which the reset means for the valve is movable at right angles with respect to the direction of movement of the valve, wherein a simpler and more efficient right angle reset drive is provided than in former valves of the class described.

Another object of the invention is to provide a simple and positive shut-off valve for shutting off the supply of gas to a main and a pilot burner upon failure of the pilot flame, in which an electromagnet energized by thermal electric current generated by the heat of the pilot flame holds the valve open by engagement with an armature connected with the valve, and in which a simple camming right angled drive connection is provided from the reset button to the valve to reset the valve by a direct axial force applied thereon, so as to avoid the tendency to cock the valve and its armature with respect to the electric magnet.

These and other objects of the invention will appear from time to time as the following specification proceeds and with reference to the accompanying drawings wherein:

Figure 1 is a fragmentary plan view of a gas control valve having a reset constructed in accordance with the present invention embodied therein;

Figure 2 is a view in side elevation of the valve shown in Figure 1 with certain parts broken away and certain other parts shown in vertical section;

Figure 3 is a fragmentary side elevational view of the valve shown in Figures 1 and 2 looking at the valve toward the opposite side thereof from Figure 2, with certain other parts broken away and shown in section in order to illustrate the reset means for the safety shut-off valve; and Figure 4 is a fragmentary view somewhat similar to Figure 3, but showing the shut-off valve in its open position.

In the embodiment of the invention illustrated in the drawings, I have shown a gas supply and safety shut-off valve 10 of a type particularly adapted to control the flow of gas to the main and pilot burners of hot water heaters and the like, which may be strapped to the outside of a hot water tank or other member being heated, with a thermostatic element 11 in contact with the wall of the tank.

The valve 10 comprises a valve body 12 having an inlet 13 leading thereinto, a pilot gas outlet 14 leading from said valve body and a main burner gas outlet 15 leading from said valve body in spaced relation with respect to said pilot gas outlet.

Gas enters the valve body 12 through the inlet 13 into a chamber 16. An inner end of the chamber 16 is defined by a wall 17 having a port 19 leading therethrough to a chamber 20. The flow of gas through the port 19 is controlled by a safety shut-off valve 21 engageable with a valve seat 23, defining the margin of the port 19 and biased into engagement with said valve seat by a spring 24. The safety shut-off valve 21 is held open by thermal electrical current generated by the heat of the pilot flame and is a disk type of valve engaging the seat 23 on its face and having a stem 25 extending therefrom in a direction away from the seat 23 through the center of the compression spring 24. A nut 26 is threaded on the opposite end of the stem 25 from the spring 24 to retain said valve to said stem. The stem 25 is suitably guided within the chamber 16 and has an armature 27 on its inner end, engageable with an electromagnet 29 when setting the valve, for holding the valve open by thermal electric current generated by the heat of the pilot flame.

As diagrammatically shown in Figure 3 a thermocouple 30 is positioned adjacent the flame issuing from a pilot burner 31 supplied with gas through the pilot outlet 14, for generating thermal electric current when heated by the flame issuing from the pilot burner, and energizing the electromagnet 29 to hold the valve 21 open, as long as the pilot is lit, as is well known to those skilled in the art, so not herein shown or described further.

The flow of gas through the pilot outlet 14 and the main gas outlet 15 is controlled by a main gas cock 33, herein shown as being in the form of a rotary plug valve. The main gas cock 33 is rotatably carried in a frusto-conical seat 35 and has an open central portion 36 opening to the chamber 20. A port 37 leads from the open central portion 36 of the gas cock 33 through a pilot passageway 39, for supplying gas to the pilot outlet 14 and the pilot burner, when the main gas cock has been turned to its pilot position with the port 37 in registry with the pilot outlet 39. A second passageway (not shown), leads from the frusto-conical wall 35 to supply gas to the main gas burner (not shown) under the control of the thermal element 11 and a snap acting valve (not shown) operated thereby in a manner similar to that shown and described in application Serial No. 479,020, filed by Samuel G. Eskin, Joseph M. Algino and Thomas B. Legeza on December 31, 1954, and no part of our present invention so not shown or described herein.

The main gas cock 33 has a boss 40 extending outwardly therefrom through a retainer 41 closing the outer end of the valve body, and is sealed to the frusto-conical seat 35 and maintained in sealing engagement with said seat as by a compression spring 43 interposed between said retainer and gas cock. A knob 44 on the outside of the valve body 12 is mounted on the boss 40 for turning the gas cock to its "Pilot," "On" and "Off" positions. As shown in Figure 1, the main gas cock is at its "On" position, the "On" indicia registering with an indicia mark 45 on the face of the valve body. When in this position the main gas cock 33 is in position to supply gas both to the pilot and the main gas burner. The knob 44 has an arcuate recess 47 extending along the face thereof to accommodate the depression of a reset button 49 for the safety shut-off valve 21, when the knob 44 and main gas cock 33 are turned to the pilot position, to supply gas to the pilot burner only.

Temperature adjustment of the valve to adjust the temperature at which the thermal element 11 will operate to snap the main burner valve closed may be attained by operation of a temperature adjustment knob 50 on the same side of the valve body as the main gas cock operating knob 44 and the reset button 49. Adjustment of the temperature at which the flow of gas to the main gas burner may be shut-off is attained by turning movement of the knob 50 in the required direction in a manner similar to that shown and described in the aforementioned joint application by Samuel G. Eskin and Thomas B. Legeza, Serial No. 479,020, and no part of the present invention so not herein shown or described further.

Referring now to the novel means for setting the safety shut-off valve 21 to its open position when it is desired to light the pilot burner, the reset button 49 is carried on the end of a slidable stem or plunger 51, slidably guided in a bearing 53 in a wall 54 forming the inner end of a substantially cylindrical cavity 55 opening to the outer face of the valve body 12. As herein shown, an inverted cup-like guide member 56 is carried on the stem or plunger 51 and is retained in engagement with the reset button 49 as by a compression spring 57 seated on the bearing 53 at one end and extending within the guide member 56 and seated thereagainst at its opposite end, and biasing the plunger 51 and reset button 49 in the outwardly extending position shown in Figure 3. The outer wall of the guide member 56 slidably moves along the wall of the cavity 55 to guide the button 49 and to prevent cocking of the plunger 51 during depression of said button.

The plunger 51 has a rounded head 59 on its inner end, forming in effect a follower engageable with an inclined camming face 60 of a slide 61 slidably guided within the valve body 12 and engageable with the end of the stem 25 in the center thereof, for moving the safety shut-off valve 21 to an open position, upon depression of the reset button 49. The slide 61 is slidably mounted on a stationary shaft 63 extending perpendicular to the plunger 51 and parallel to the stem 25 of the safety shut-off valve 21 and spaced laterally from said stem. The shaft 63 is shown as being mounted at its ends in ears or lugs 64 extending inwardly from an end closure plate 65 sealing the chamber 20 as by a seal 66 and retained to said chamber by machine screws 67. A compression spring 69 encircles the shaft 63 and is interposed between the inner lug or ear 64 and the side of the slide 61 facing the safety shut-off valve 21, to bias the slide 61 in the retracted position shown in Figure 3 when pressure is relieved from the reset button 49. The slide 61 also has a widened base 70 having spaced feet 71 slidably engageable with the under or inner side of the plate 65, to retain the slide 61 from turning movement about the shaft 63 and to maintain a projecting engaging end portion 73 of said slide in alignment with the center of the safety shut-off valve 21, to move said safety shut-off valve in a straight line path without cocking during the resetting operation.

When it is desired to light the pilot burner, the knob 44 is turned to its pilot position. When in this position the recess 47 in said knob will be in registry with the reset button 49. The reset button 49 may then be depressed and moved inwardly along the edge of the knob 44 along the recess 47 to engage the follower end 59 of the plunger 51 with the inclined camming face of the slide 61. Continued depressible movement of the reset button 49 will cam the slide 61 against the spring 69, to first engage the engaging end portion 73 thereof with the end of the stem 25 and then move the safety shut-off valve 21 off its seat against the compression spring 24 and engage the armature 27 with the magnet coil 29.

The pilot burner may then be lit. The reset button 49 is, however, held depressed until the thermocouple has been heated to the extent necessary to generate sufficient thermal electric current to energize the electromagnet 29 sufficiently to hold the armature 27 in engagement therewith and hold the valve 21 open against the bias of the spring 24. As pressure is relieved from the reset button 49 the spring 57 will move said button to the retracted position shown in Figure 3. The spring 69 will return the slide 61 at the same time. The main burner may then be lit by turning movement of the knob 44 from its pilot position to the on position shown in Figure 1. In this position of the knob 44 the face of the knob will intercept the reset button 49 upon the attempted depression thereof and will prevent the resetting of the safety shut-off valve 21 until the knob 44 is again turned to its pilot position.

It may be seen from the foregoing that a simple reset has been provided for a safety gas valve in which all of the controls are on one face of the valve body and the safety shut-off valve moves axially to its open and closed positions along an axis at right angles to the controls and main gas cock.

It may further be seen that the right angle drive from the reset to the safety shut-off valve engages the valve in axial alignment with the center thereof and moves the valve to its open position by the direction of a straight line force thereagainst and thus avoids all danger of cocking the valve or its armature during the resetting operation and assures full engagement of the armature 27 with the electromagnet 29 when the valve is open.

It will be understood that modifications and variations of the present invention may be effected without departing from the spirit and scope of the novel concepts thereof.

We claim as our invention:

1. In a safety shut-off valve for gas burners and the like, a valve body having a valve chamber therein, a port leading through and end wall of said chamber, an inlet into said chamber, an outlet chamber on the downstream side of said port, an outlet from said valve body, valve means in said outlet chamber for controlling the flow of gas through said outlet, an axially movable valve in said first mentioned chamber, spring means biasing said axially movable valve into engagement with said port, a magnet in said first mentioned chamber energized by thermal electric current, an armature connected with said axially movable valve and engageable with said magnet for holding said axially movable valve open upon energization thereof, a reset member guided for axial movement in a direction perpendicular to the axis of movement of said axially movable valve and having a reset button on the outside of said valve body and having a follower end portion movable within said outlet chamber, a gas cock knob for operating said valve means and normally preventing depressible movement of said reset button except when said valve means is in a predetermined position to admit gas through said outlet, a thermal element mounted in said outlet chamber and arranged to open and close said valve means, said thermal element having a thermal sensitive portion projecting from one side of said valve body, a temperature adjustment knob projecting from the opposite side of said valve body and operatively connected with said thermal element in direct axial alignment therewith, to vary the effective temperature range of operation of said thermal element and a slide within said outlet chamber and slidably guided for movement in a direction parallel to the axis of axial movement of said axially movable valve, said slide having an inclined camming face engageable by the follower end portion of said reset member and moved by engagement of said follower end portion with said camming face upon depressible movement of said reset member to exert an opening force on said axially movable valve in alignment with the axis of axial movement thereof said gas cock knob and reset button being on the same side of said valve body as said temperature adjustment knob.

2. In a safety shut-off valve for gas burners and the like, a valve body having a valve chamber therein, a port leading through an end wall of said chamber, an inlet into said chamber, an outlet chamber on the downstream side of said port, an outlet from said valve body, valve means in said outlet chamber for controlling the flow of gas through said outlet, an axially movable valve in said first mentioned chamber, spring means biasing said axially movable valve into engagement with said port, a magnet in said first mentioned chamber energized by thermal electric current, and armature connected with said axially movable valve and engageable with said magnet for holding said valve open upon energization thereof, a reset member guided for axial movement in a plane perpendicular to the axis of movement of said axially movable valve and having a reset button on the outside of said valve body and having a follower end portion movable within said outlet chamber, a gas cock knob for operating said valve means and normally preventing depressible movement of said reset button except when said valve means is in position to admit gas through said pilot outlet, a thermal element mounted in said outlet chamber and arranged to open and close said valve means, said thermal element having a thermal sensitive portion projecting from one side of said valve body, a temperature adjustment knob projecting from the opposite side of said valve body and operatively connected with said thermal element to vary the effective temperature range of operation of said thermal element, a slide within said outlet chamber and slidably guided for movement in a direction parallel to the axis of axial movement of said axially movable valve, said slide having an inclined camming face engageable by the follower end portion of said reset member and moved by engagement of said follower end portion with said camming face upon depressible movement of said reset member to exert an opening force on said axially movable valve in alignment with the center of axial movement thereof, spring means biasing said slide in retracted relation with respect to said axially movable valve said gas cock knob and reset button being located on the same side of said valve body as said temperature adjustment knob.

3. In a safety shut-off valve for gas burners and the like, a hollow valve body having a wall therein having a port leading therethrough an inner margin of which defines a valve seat, an inlet into said valve body on one side of said port, an outlet from said valve body on the opposite side of said port, valve means associated with said outlet for controlling the flow of gas through said outlet an axially movable valve engageable with said seat, a spring biasing said valve into engagement with said seat, a magnet within said hollow valve body on the inlet side of said port and energized by thermal electric current, an armature connected with said valve for engagement with said magnet when said valve is in an open position to hold the valve open against its spring bias upon the energization of said magnet by thermal electric current, a reset member guided in said valve body for axial movement in a plane perpendicular to the direction of movement of said valve on the downstream side of said port and having a reset button on the outside of said valve body and having a follower end portion movable within said valve body, a thermal element arranged to open and close said valve means mounted in said hollow valve body and having a thermal sensitive portion extending to the outside of said valve body, a temperature adjustment knob operatively connected with said thermal element in direct axial alignment therewith to vary the effective temperature range of operation of said thermal element, said temperature adjustment knob and said reset member being located on the opposite side of said valve body from said thermal element a guide shaft within said hollow valve body on the downstream side of said port and extending parallel to the axis of movement of said valve and spaced therefrom, and a slide slidably mounted on said guide shaft and extending angularly therefrom towards said valve and having an engaging end portion in axial alignment with the axis of movement of said valve, the angular portion of said slide forming an inclined camming face engaged by said follower end portion of said reset member upon depressible movement thereof, and said engaging end portion axially moved thereby along said shaft to exert a straight line valve opening force on said valve upon depressible movement of said reset button.

4. In a safety shut-off valve for gas burners and the like, a hollow valve body having a wall therein having a port leading therethrough, an inner margin of which defines a valve seat, an inlet into said valve body on one side of said port, an outlet from said valve body on the opposite side of said port, valve means associated with said outlet chamber for controlling the flow of gas through said outlet an axially movable valve engageable with said seat, a spring biasing said valve into engagement with said seat, a magnet within said hollow valve body on the inlet side of said port and energized by thermal electric current, an armature connected with said valve for engagement with said magnet when said valve is in an open position to hold the valve open against its spring bias upon the energization of said magnet by thermal electric current, a reset member guided in said valve body for axial movement in a direction perpendicular to the axis of movement of said valve on the downstream side of said port having a reset button on the outside of said valve body having a follower end portion movable within said valve body, a thermal element mounted in said hollow valve body to open and close said valve means and having a thermal sensitive portion extending from one side of said valve body, a temperature adjustment knob operatively connected with said thermal element in direct axial alignment therewith, and rotatably movable to vary the effective temperature range of operation of said thermal element, said temperature knob and said button being on the opposite side of said valve body from said thermal element a guide shaft within said hollow valve body on the downstream side of said port and extending parallel to the axis of movement of said valve and spaced therefrom, a slide slidably guided on said guide shaft, said slide having an inclined camming face in alignment with said follower end portion for engagement thereby and extending toward said valve and having an engaging end portion in axial alignment with the axis of axial movement of said valve, and a spring biasing said reset member in retracted relation with respect to said valve body and biasing said follower out of engagement with said camming face, said follower having a rounded engaging face engageable with said camming face for moving said slide in a straight line direction to open said valve with a force directed at the axis of axial movement thereof.

References Cited in the file of this patent

UNITED STATES PATENTS

| 2,499,318 | Jungerhans | Feb. 28, 1950 |
| 2,658,514 | Meusy | Nov. 10, 1953 |